United States Patent [19]
Ishitoya et al.

[11] Patent Number: 5,694,339
[45] Date of Patent: Dec. 2, 1997

[54] ROUNDNESS MEASURING APPARATUS

[75] Inventors: Takao Ishitoya, Kanagawa; Yoshiyuki Omori, Kure; Tsukasa Kojima, Sapporo, all of Japan

[73] Assignee: Mitutoyo Corporation, Kanagawa, Japan

[21] Appl. No.: 650,795

[22] Filed: May 20, 1996

[30] Foreign Application Priority Data

May 23, 1995 [JP] Japan ................................... 7-148122

[51] Int. Cl.⁶ ................................................. G10D 1/00
[52] U.S. Cl. ............... 364/560; 364/474.37; 364/474.36; 33/504; 33/503
[58] Field of Search .................... 364/560, 479.37, 364/474.36; 33/552, 504, 503, 520, 558, 568; 73/865.8

[56] References Cited

U.S. PATENT DOCUMENTS

| | | | |
|---|---|---|---|
| 4,070,762 | 1/1978 | Siddall | 33/174 |
| 4,167,066 | 9/1979 | Cooper et al. | 33/174 P |
| 4,800,652 | 1/1989 | Ballas et al. | 33/552 |
| 4,805,314 | 2/1989 | Hayashi et al. | 33/503 |
| 4,807,152 | 2/1989 | Lane et al. | 364/513 |
| 4,976,043 | 12/1990 | Bieg | 33/551 |
| 5,117,081 | 5/1992 | Bagdal | 219/69.1 |
| 5,198,990 | 3/1993 | Farzan et al. | 364/560 |
| 5,209,131 | 5/1993 | Baxter | 73/865.8 |
| 5,224,272 | 7/1993 | Toraason et al. | 33/504 |
| 5,337,485 | 8/1994 | Chien | 33/550 |

OTHER PUBLICATIONS

Karl Gebert, "3D–Messtechnik zur Qualitätssicherung und NC–Programming," *Werkstatt und Betrieb*, 126 (1993) Dec., No. 12, Munchen, Germany, pp. 772–774. (with English extracts).

H. Hahn, "Wichtige Komponenten zum flexiblen Messen aufKoordinatenmessgeräten," *WT Zeitschrift für industrielle Fertigung*, 74 (1984) No. 9, pp. 539–544. (with English extracts).

*Primary Examiner*—James P. Trammell
*Assistant Examiner*—Patrick Assouad
*Attorney, Agent, or Firm*—Oliff & Berridge

[57] ABSTRACT

An object is mounted and rotated on a rotary table. An encoder outputs a rotary angle signal corresponding to the rotary angle of the rotary table. A detection head outputs a displacement detection signal while tracing the surface of the object. The detection head moves within a plane including the axis of rotation, so as to oppose the outer or inner surface of the object. When the detection head is opposed to the inner surface of the object, the positive and negative signs of the displacement detection signal is reversed, while at the same time a 180° angle is added to the rotary angle signal. By utilizing the reversed displacement detection signal and the corrected angle correction signal, the obtained result can be displayed through a displaying processing common to the processing for the outer surface.

8 Claims, 8 Drawing Sheets

ROUNDNESS MEASURING APPARATUS

BACKGROUND OF THE INVENTION

1. Field of the Invention

The present invention relates to a roundness measuring apparatus capable of measuring a form of an outer and/or an inner surface of an object or a workpiece, such as a solid column, a hollow cylinder, or a cone, so as to obtain various data including a roundness, a concentricity and a coaxiality based on the measured form of the surface.

2. Description of the Prior Art

A roundness measuring apparatus brings a detection head into contact with an object placed on a rotary table which rotates around the axis of rotation. The detection head detects a deviation of the surface of the object from an ideal surface around the axis of rotation.

For instance, when a roundness is measured for the peripheral surface of a column, an ideal circle is previously defined around the axis of rotation in a desired horizontal plane. How the actual peripheral surface deviates from the ideal circle is then detected using the detection head, which is fixed both in the radial direction (R axis direction) and the height direction (Z axis direction) of the rotary table. The detection head swingably supports a stylus having a contact for contacting an object to be measured. When the contact at the tip of the stylus traces the irregularity of the actual surface, the contact moves in the radial direction substantially within the horizontal plane in response to the irregularity. The detection is made to reveal the distance which the stylus has displaced. The distance is a deviation, that is, a displacement from the ideal circle. When a roundness is measured, deviations in the radial direction are continuously detected along the circumference while rotating the rotary table at an interval of an equal angle, to thereby detect the deviation of the entire actual circle from the ideal circle.

The contact in the detection head has a displacement track which has a direction. For instance, the tip of the stylus is biased in a predetermined direction in the detection head of a roundness measuring apparatus. The bias can keep the contact in touch with the surface of the object. The direction of bias coincides with the direction of the displacement track. Midpoint of the displacement track is defined as a peculiar detection reference "0". A distance from the detection reference "0" along the displacement track is output as a displacement signal. When the contact moves toward the head of the direction arrow by the aid of the biasing force, a positive value is obtained. To the contrary, when the contact moves toward the tail of the direction arrow against the biasing force, a negative value is obtained. The identification of either positive or negative value serves to distinguish a peak or a valley with respect to the ideal circle. For example, the detection of an irregularity of the outer circumference of a column thus first requires the coincidence of the direction of the displacement track with the radial direction of the column. Rotation of the column then makes it possible to obtain the rotary angle and the displacement as position data.

However, when detecting the roundness of the inner surface of a hollow cylinder with the roundness measuring apparatus using such a detection head set forth above, the direction of the detection head is first reversed so that the contact keeps following the inner surface of the cylinder by the biasing force. The manual handling for changing the direction of the detection head by 180° requires a troublesome work. In addition, the operator's hand induces an increase in the temperature of the detection head or the stylus, which may cause detection errors. Further, although the references of rotation angles should be identical to each other between the measurements of the outer and inner surfaces in detecting the concentricity or coaxiality of the outer and inner surfaces of a cylindrical object, the coincidence may be disturbed by the intervention of a manual handling in reversing the direction of the detection head.

SUMMARY OF THE INVENTION

The present invention therefore aims to provide a roundness measuring apparatus capable of improving detection errors by minimizing intervention of a manual work, as well as of accurately measuring the form of the inner and outer surfaces of an object with a simple structure.

According to the first aspect of the invention, there is provided a roundness measuring apparatus comprising: a rotary table capable of mounting an object having continuous inner and outer surfaces around an axis of measurement; an encoder capable of outputting a rotary angle signal corresponding to a rotary angle of the rotary table; a detection head capable of detecting a displacement from a detection reference along a peculiar detection direction having positive and negative directions with respect to a peculiar detection reference, to thereby output a displacement detection signal corresponding to the displacement in response to an output of the rotary angle signal; R axis guiding means capable of guiding the detection head along a straight line passing though the axis of measurement; polarity reversing means capable of reversing positive and negative signs of the displacement detection signal on a decision whether the detection head is opposed to the outer or inner surface of the object along the straight line; and angle correction means capable of introducing a 180° correction angle to the rotary angle signal when the polarity reversing means reverses the positive and negative signs so as to generate a corrected angle signal, wherein form of the outer and inner surfaces of the object is measured while retaining the peculiar detection direction.

With the above arrangement, the displacement detection signal from the detection head is subjected to the reversing treatment of positive and negative signs and the correction of the phase angle, so that the outer and inner surfaces of the object can be accurately displayed through a common image processing. The outer and inner surfaces thus can automatically and continuously be detected. Further, the elimination of a manual work makes it possible to prevent detection errors.

According to the second aspect of the invention, there is provided a roundness measuring apparatus comprising: a rotary table capable of rotating an object around an axis of rotation; a detection head capable of outputting a displacement detection signal by detecting a deviation of an actual surface from an ideal surface using a displacement track having a direction along a straight line passing through the axis of rotation, said detection head movable within a plane including the axis of rotation; and polarity reversing means capable of reversing the positive and negative signs of the displacement detection signal in case where the displacement track directs in a direction apart from the axis of rotation, as compared to case where the displacement track directs in a direction toward the axis of rotation.

With the above arrangement, the outer and inner surfaces of the object can be accurately displayed through a common image processing by adjusting the detected rotary angle at a subsequent processing.

BRIEF DESCRIPTION OF THE DRAWINGS

The above and the other objects, features and advantages will be apparent from the following description of the preferred embodiment taken in conjunction with the accompanying drawings wherein.

DESCRIPTION OF THE PREFERRED EMBODIMENTS

Figure 1:
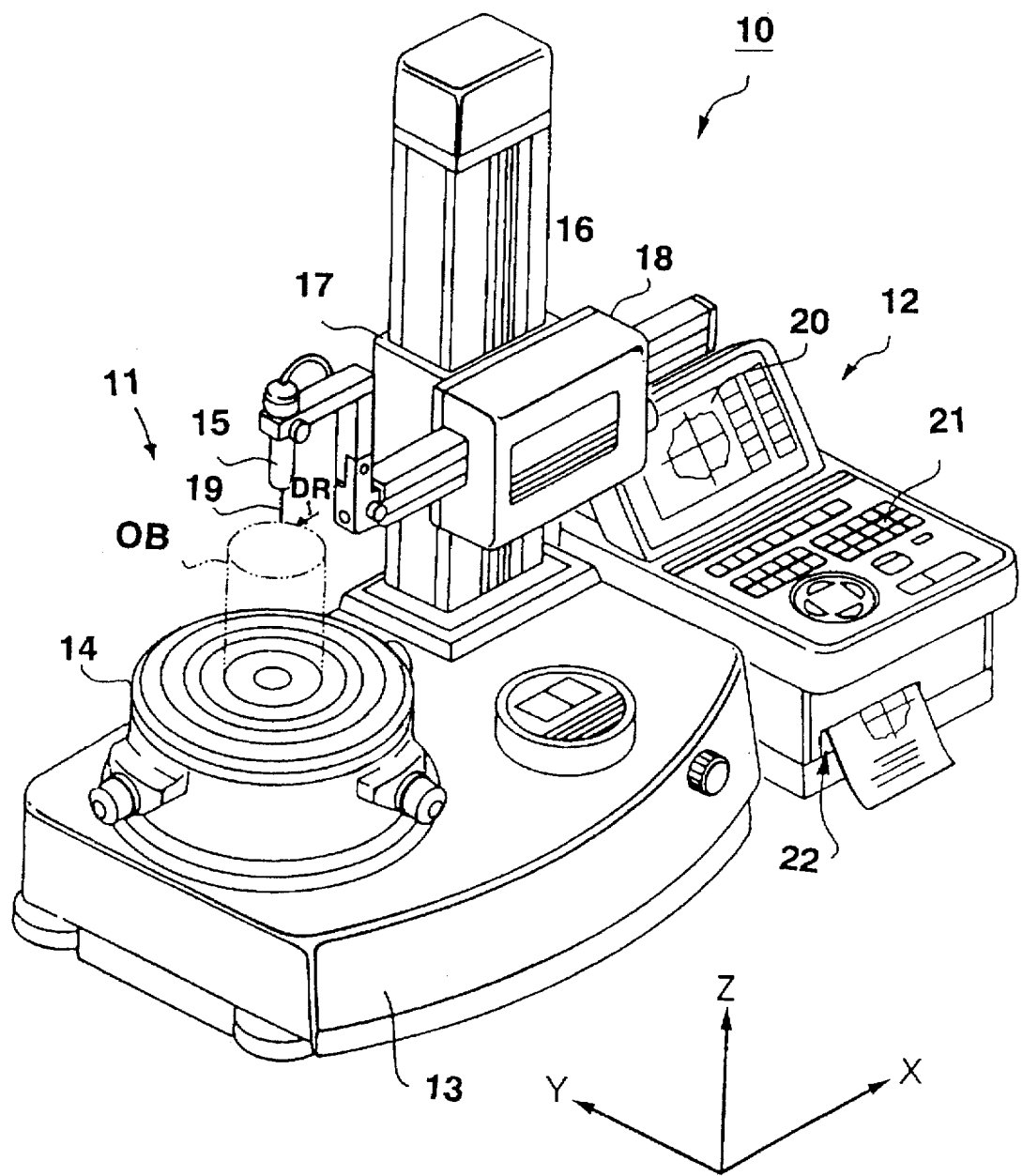
FIG. 1 is a perspective view showing a roundness measuring apparatus according to a preferred embodiment of the present invention.

FIG. 1 shows a roundness measuring apparatus 10 according to a preferred embodiment of the present invention. The roundness measuring apparatus 10 comprises a measurement unit 11 for measuring the form of the surface of an object OB or a workpiece, and a controlling/processing unit 12 for controlling the measurement operation of the measurement unit 11 and for processing position data which is obtained through the measurement.

The measurement unit 11 comprises a base 13 fixedly placed on a desired horizontal plane. The base 13 includes a rotary table 14 for rotating the object OB at a constant speed around an axis of rotation (an axis of measurement) which is perpendicular to the horizontal plane, and a head driving mechanism 16 for moving a detection head 15, for detecting the form of the surface of the object OB, within a predetermined plane including the axis of rotation. The head driving mechanism 16 has a Z axis guiding means 17 for guiding the detection head 15 along the Z axis, which is parallel to the axis of rotation, and an R axis guiding means 18 for guiding the detection head 15 along the R axis, which is a diametrical line passing through the axis of rotation.

A stylus 19 is attached to the tip of the detection head 15. The stylus 19 is biased along a plane in the direction DR of the displacement track by bias means, such as a spring, so as to urge the contact at the tip thereof against the object when measuring the form of the surface of the object. The amount of the displacement of the contact along the displacement track is detected by a differential transformer, not shown, incorporated in the main body of the detection head 15. The range of swinging movement of the stylus 19, or the range of the displacement of the contact, is determined at ±300 μm from a peculiar detection reference which is established at the midpoint of the displacement track.

The controlling/processing unit 12 comprises a display 20 for displaying various data, a keyboard 21 through which a user inputs various information, and a printer 22 for printing out data or the like as required.

Figure 2:
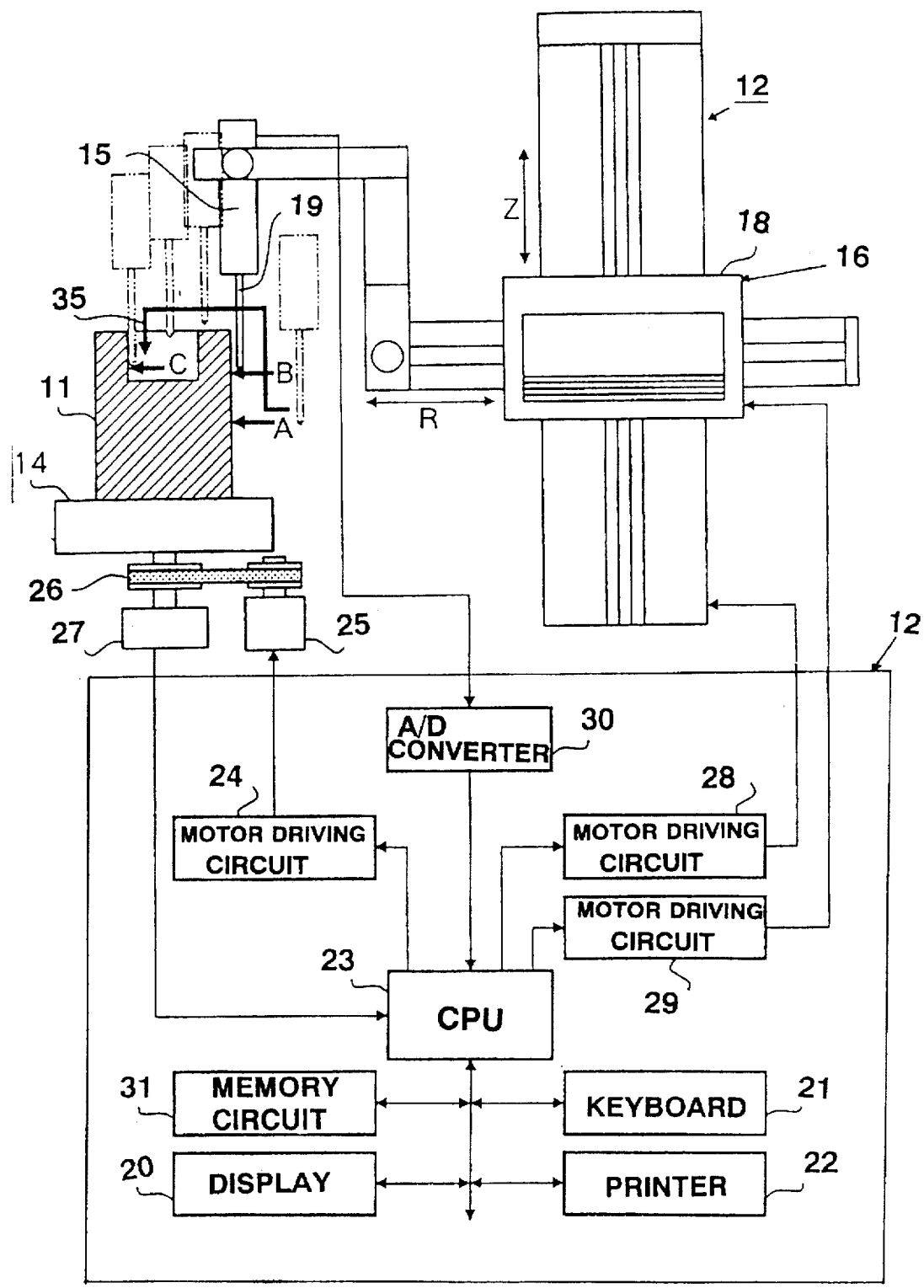
FIG. 2 is a block diagram showing a structure of a controlling/processing unit.

The controlling/processing unit 12 further comprises, as shown in FIG. 2, a CPU 23 for controlling the operation of the rotary table 14 and head driving mechanism 16, and for processing the obtained position data through calculation. The CPU 23 outputs a rotary table driving command, which is supplied to a first motor driving circuit 24 so as to drive a motor 25. The driving force of the motor 25 is transmitted, via a driving force transmission mechanism 26, to the driving axis of the rotary table 14. The rotary angle of the rotary table 14 is detected by a rotary encoder 27, which then supplies a rotary angle signal in the form of a digital signal corresponding to the detected rotary angle into the CPU 23.

The CPU 23 adjusts the position of the detection head 15. When a Z axis driving command from the CPU 23 is supplied into a second motor driving circuit 28, a pulse motor, not shown, which is incorporated in the Z axis guiding means 17 is activated. The driving force of the pulse motor drives the detection head 15 along the Z axis so as to position the detection head 15. When an R axis driving command from the CPU 23 is supplied into a third motor driving circuit 29, a pulse motor, not shown, which is incorporated in the R axis guiding means 18 is activated. The driving force of the pulse motor drives the detection head 15 along the R axis so as to position the detection head 15.

The CPU 23 receives, via an A/D converter 30, a displacement detection signal in the form of a digital signal from the detection head 15. The received displacement detection signal is stored in a memory circuit 31 along with the rotary angle signal from the rotary encoder 27. The two digital signals constitute position data regarding the form of the surface.

Figure 3:
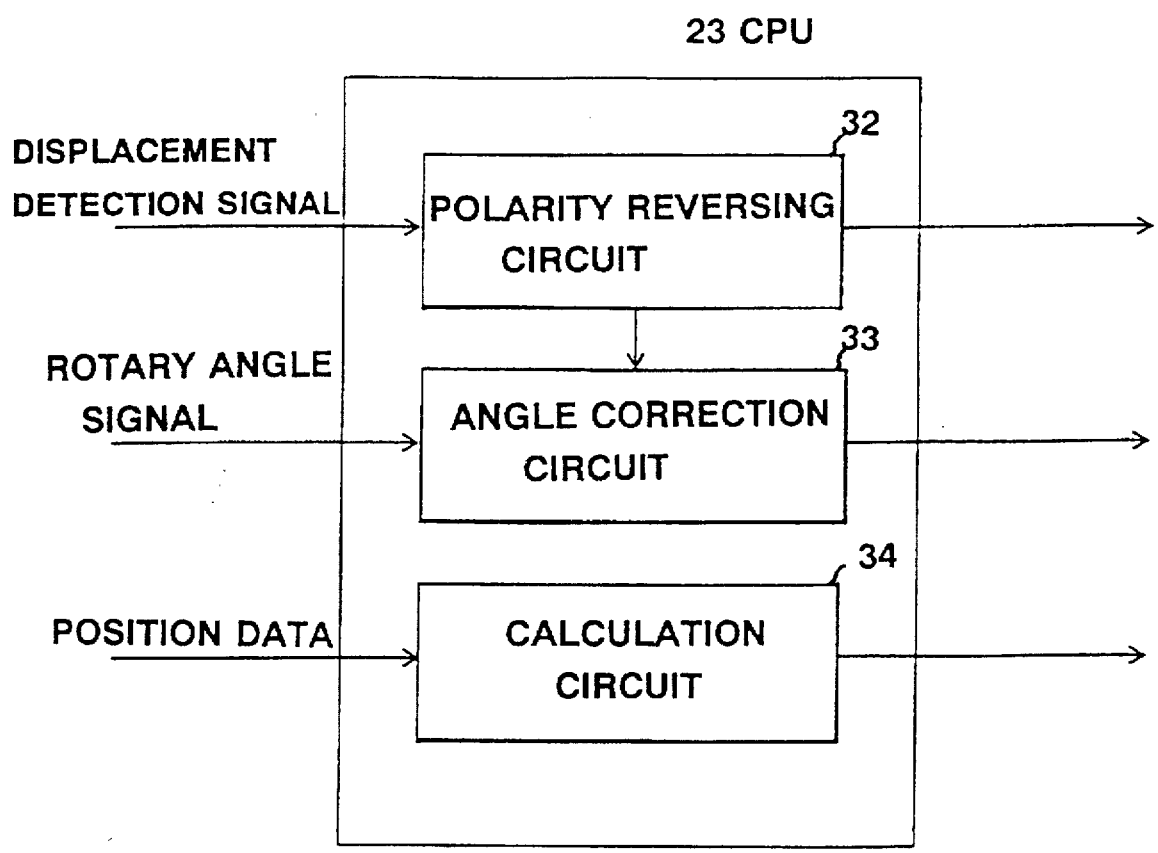
FIG. 3 is a block diagram showing a structure of a CPU.

The CPU 23 includes, as shown in FIG. 3, a polarity reversing circuit 32 for reversing positive and negative signs of a displacement detection signal for an output when the displacement track defined in the detection head 15 directs in the direction apart from the axis of rotation. A driving command addressed to the head driving mechanism 16 can be used to determine whether the displacement track directs in the direction toward or apart from the rotary axis. When the polarity reversing circuit 32 reverses the positive and negative signs of the displacement detection signal, an angle correction circuit 33 introduces a 180° correction angle to the rotary angle signal from the rotary encoder 27 so as to generate a corrected angle signal. The displacement detection signal from the polarity reversing circuit 32 and the corrected angle signal with an additional 180° angle are both stored in the memory circuit 31 as position data.

The stored position data are input to a calculation circuit 34. The calculation circuit 34 calculates a mean circle according to the known method of least squares or minimum area (zone). The roundness and coaxiality are calculated based on the calculated mean circle. The result of the calculation may be displayed on the display 20, output via the printer 22, or reported to the outside via a communication line, not shown.

Figure 4:
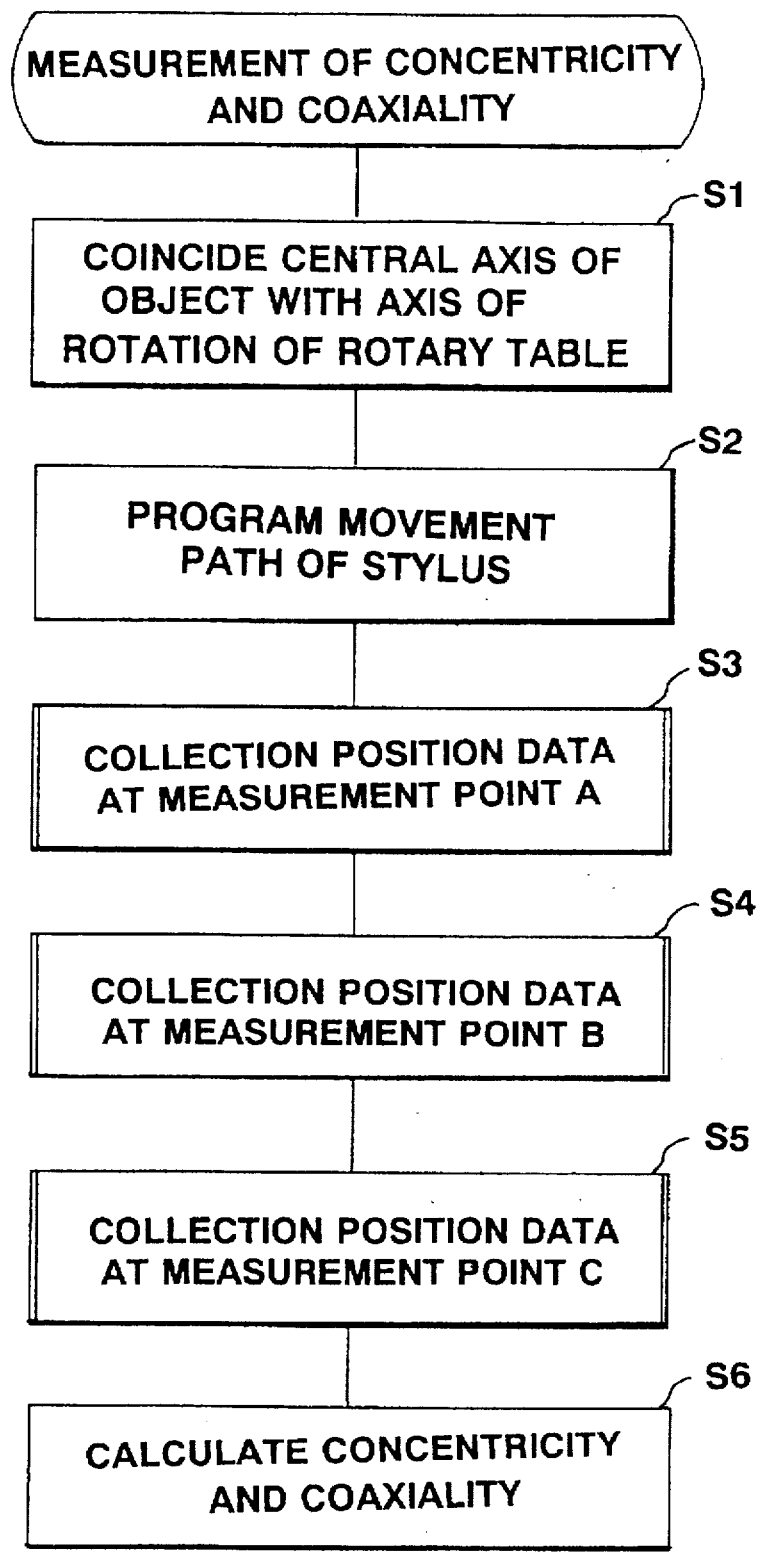
FIG. 4 is a flow chart showing an operational procedure of the roundness measuring apparatus.

Assume that the coaxiality of the outer surface as well as the concentricity of the inner and outer surfaces are measured for a hollow cylinder as an object OB having continuous outer and inner surfaces around the axis of rotation. As shown in FIG. 4, the central axis of the object OB is manually or automatically coincided with the axis of rotation of the rotary table 14 in the first step S1. The operator programs a movement path 35 (see FIG. 2) of the stylus 19 via the keyboard 21 in the second step S2. In this step, attention is required to prevent the detection head 15 or the stylus 19 from striking the object OB. The detection head 15 is moved to measurement points A and B at the third and fourth steps S3 and S4, so that position data is obtained regarding the roundness at the measurement points A and B which are defined on the outer surface of the object OB. In the fifth step S5, the detection head 15 is moved to measurement point C, so that position data is obtained regarding the roundness at the measurement point C which is defined on the inner surface of the object OB. In this measurement, the coordinates (R,Z) of the measurement points A, B and C are given the coordinates of an ideal surface of the object OB.

Finally in the sixth step S6, a mean circle is calculated at the measurement points A, B and C on the basis of the obtained position data, utilizing a method of least squares or minimum zone. Using the obtained mean circle as reference, the coaxiality and concentricity of the object OB are calculated.

Figure 5:
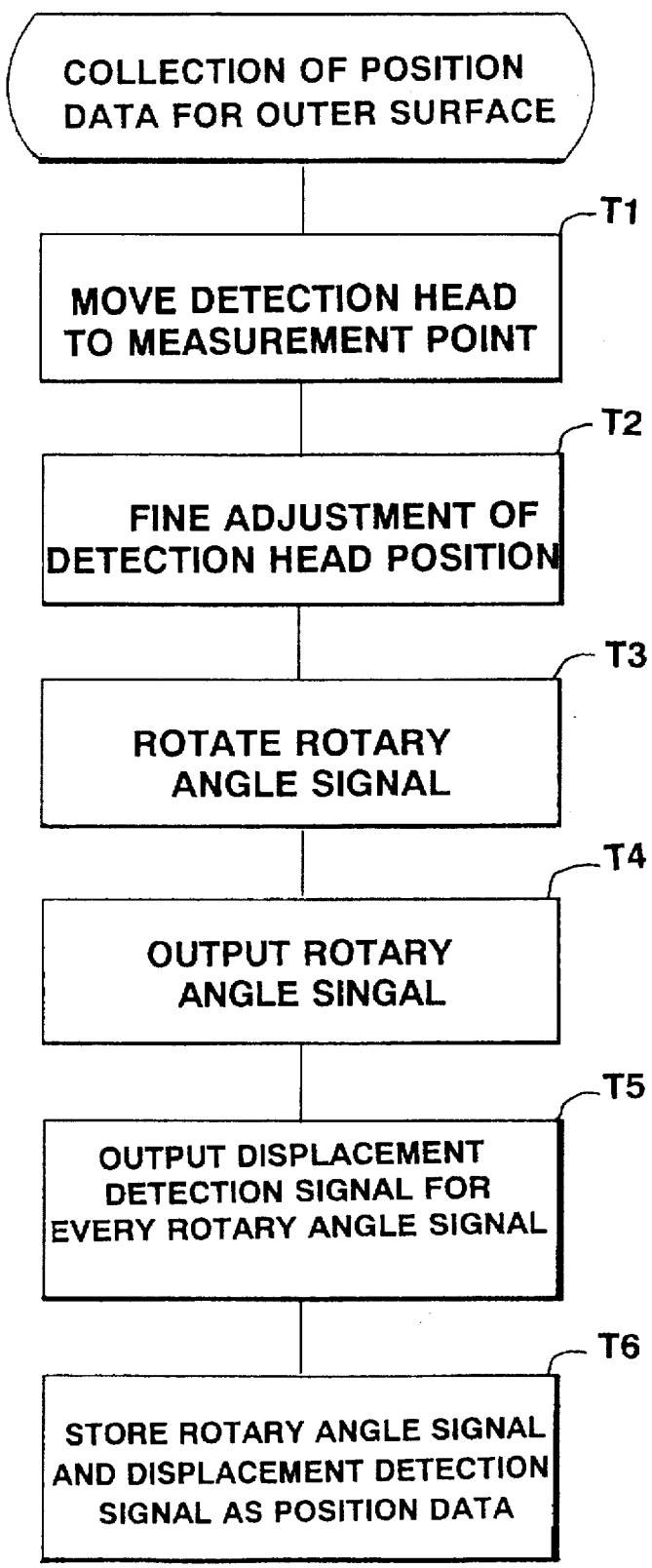
FIG. 5 is a flow chart showing a detection operation at measurement points A and B.

The processes of the third and fourth steps S3 and S4 of FIG. 4 are next described in detail. Since the both processes are identical to each other, only the process at the third step S3 is described below. The CPU 23 drives, as shown in FIG. 5, the detection head 15 to the measurement point A along the programmed movement path in the first step T1. When the detection head 15 reaches the measurement point A at the second step T2, the contact contacts the object OB, whereupon the position of the detection head 15 is finely adjusted by means of the R axis guiding means 18, so that the midpoint of the displacement track, that is, the detection reference "0" is coincided with the coordinates of the measurement point A.

The CPU 23 then rotates the rotary table 14 at a constant speed in the third step T3. The rotary angle of the rotary table 14 is detected by the rotary encoder 27 at the fourth step T4, and inputted as a rotary angle signal into the CPU 23 at an equal interval. The contact at the tip of the stylus 19 is displaced along the irregularity of the actual surface in response to the rotation of the rotary table 14. Since the detection head 15 is opposed to the outer surface of the object in this example, a positive value is detected with respect to the detection reference "0" when the contacts traces a valley section on the surface. To the contrary, when the contacts traces a peak section on the surface, a negative value is detected with respect to the detection reference "0". In the fifth step T5, the detection head 15 outputs a displacement detection signal for every output of the rotary angle signal for an input into the CPU 23. The CPU 23 stores the rotary angle signal and the displacement detection signal in the memory circuit 31 as position data in the sixth step T6.

Figure 7:
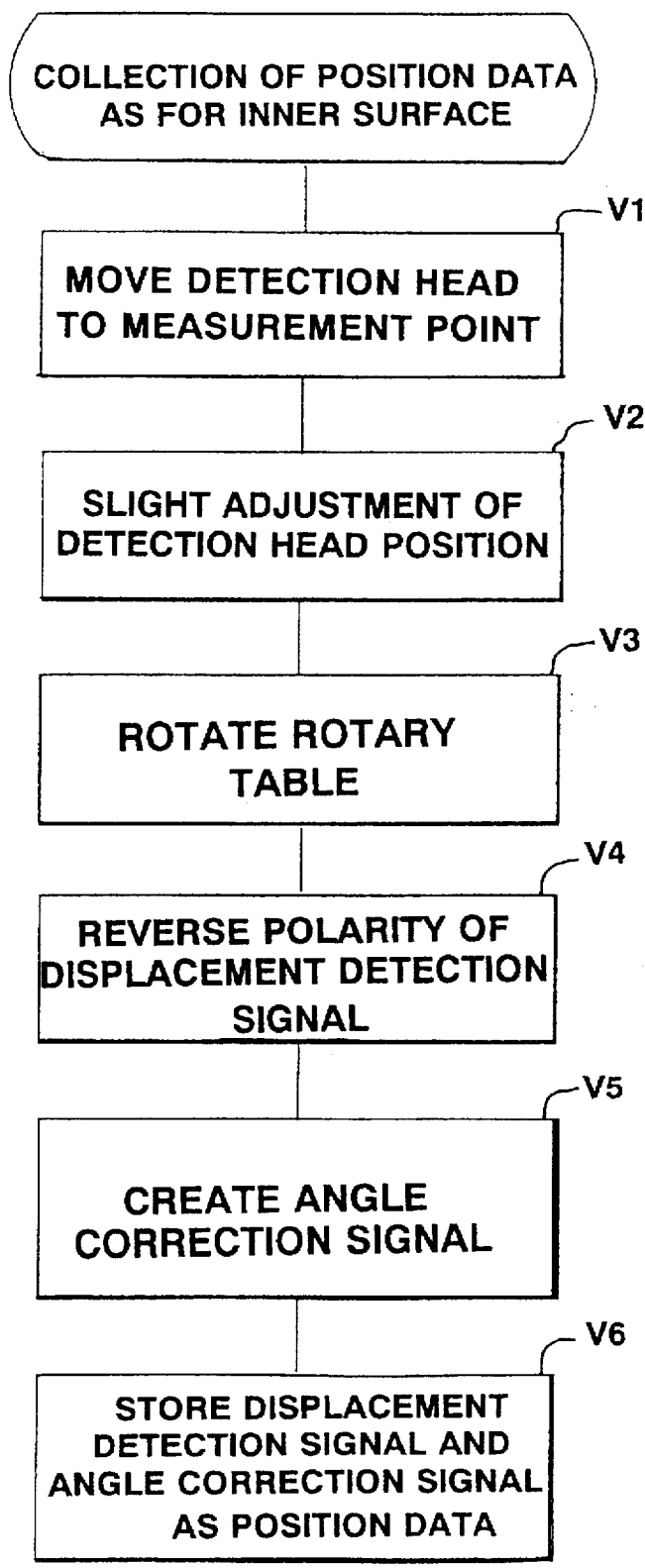
FIG. 7 is a flow chart showing a detection operation at measurement point C.

The process in the fifth step S5 of FIG. 4 will next be described in detail. The detection head 15 is, as shown in FIG. 7, in the similar manner to the above, positioned at the measurement point C in the first and second steps V1 and V2. The detection head 15 is precisely moved in cooperation of the Z axis and R axis guiding means 17 and 18. The CPU 23 detects that the direction of the displacement track in the detection head 15 is aligned with the direction apart from the axis of rotation on the diametrical line of the object OB.

Figure 6:
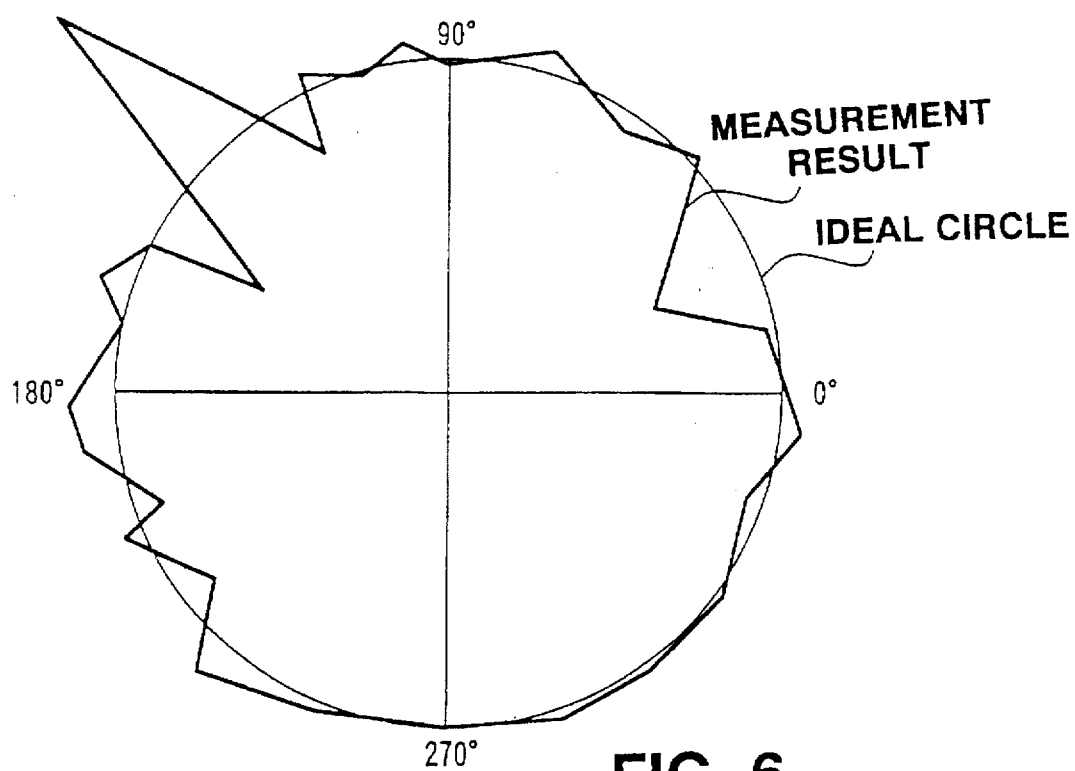
FIG. 6 shows an example in which position data is plotted regarding the inner surface of an object.

When the rotary table 14 rotates in the third step V3, the rotary encoder 27 outputs rotary angle signals, while the detection head 15 outputs displacement detection signals for every rotary angle signal. Since the detection head 15 is opposed to the inner surface of the object, a positive value is detected with respect to the detection reference "0" when the contact traces a valley section on the surface. To the contrary, when the contact traces a peak section on the surface, a negative value is detected with respect to the detection reference "0". The rotary angle signal and displacement detection signal constitute position data, for example as shown in FIG. 6.

Figure 8:
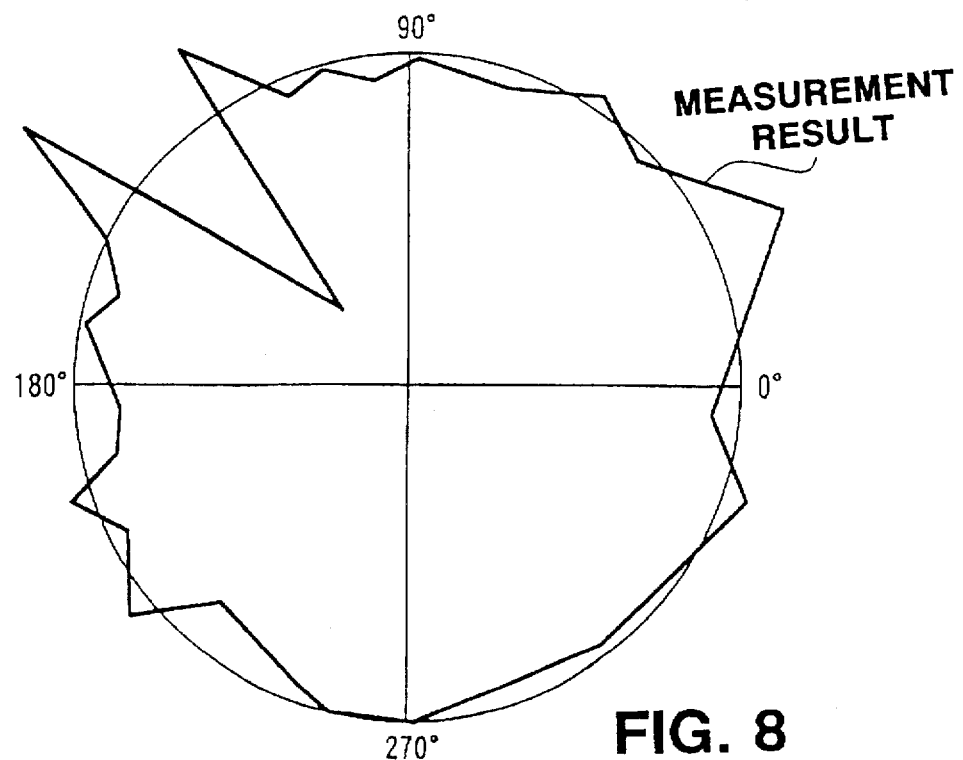
FIG. 8 shows an example in which position data is plotted after reversing the positive and negative signs of the displacement detection signal.
Figure 9:
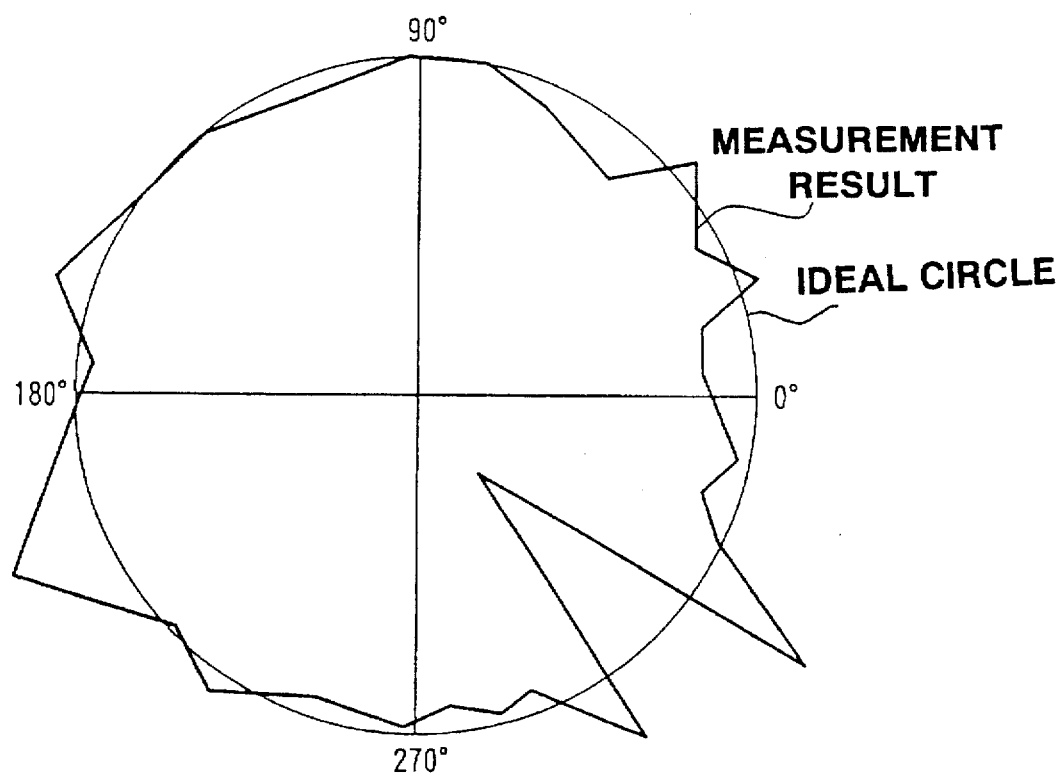
FIG. 9 shows an example in which position data is plotted after introducing the 180 degree correction angle to the position data shown in FIG. 8.

In the fourth step V4, the polarity reversing circuit 32 of the CPU 23 reverses the positive and negative signs of the displacement detection signal. The position data of FIG. 6 can be converted to position data as shown in FIG. 8. In the fifth step V5, the angle correction circuit 33 introduces a 180° correction angle to the rotary angle signal. The displacement detection signal from the polarity reversing circuit 32 and a corrected angle signal from the angle correction circuit 33 are stored as position data in the memory circuit 31 (the sixth step V6). With the introduction of the processes in the fourth and fifth steps V4 and V5, the inner surface of a hollow cylinder can be displayed through a displaying processing common to the position data for the outer surface, without a subsequent particular processing. Further, the detection of the inner surface can automatically be completed subsequent to the process for the outer surface, without any intervening by a manual work of the operator with no detection errors. When the position data of the outer surface and the inner surface (i.e. FIG. 9) are displayed with both the diameters of the surfaces aligned with each other, the concentricity of the inner and outer surfaces and the variation of the thickness of the surface wall can easily be observed at a glance.

Although the polarity reversing circuit 32, the angle correction circuit 33 and the calculation circuit 34 of the CPU 23 are constituted by hardware in the above embodiment, software installed in the memory circuit 31 can be used to have the CPU 23 to carry out polarity reversing process and angle correcting process. In addition, measurement points are not limited to those three points and any combination of measurement points can be employed. Further, the present invention can be applied to the measurement of an object of a complicated structure, including a combination of a plurality of cylinders having different diameters.

What is claimed is:

1. A roundness measuring apparatus, comprising:
   a rotary table for mounting an object having continuous inner and outer surfaces around an axis of measurement;
   an encoder for outputting a rotary angle signal corresponding to a rotary angle of the rotary table;
   a detection head for detecting a displacement from a detection reference along a peculiar detection direction having positive and negative directions with respect to a peculiar detection reference, to thereby output a displacement detection signal corresponding to the displacement in response to an output of the rotary angle signal;
   R axis guiding means for guiding the detection head along a straight line passing through the axis of measurement;
   polarity reversing means for reversing positive and negative signs of the displacement detection signal when the detection head is opposed to the inner surface of the object along the straight line; and
   angle correction means for introducing a 180° correction angle to the rotary angle signal when the polarity reversing means reverses the positive and negative signs so as to generate a corrected angle signal, wherein a form of the outer and inner surfaces of the object is measured while retaining the peculiar detection direction.

2. A roundness measuring apparatus, comprising:
   a rotary table for rotating an object around an axis of rotation;
   a detection head for outputting a displacement detection signal by detecting a deviation of an actual surface from an ideal surface using a displacement track having a direction along a straight line passing through the axis of rotation, said detection head movable within a plane including the axis or rotation; and polarity reversing means for reversing positive and negative signs of the displacement detection signal when the displacement track directs in a direction apart from the axis of rotation, as compared to when the displacement track directs in a direction toward the axis of rotation.

3. A roundness measuring apparatus, comprising:

a rotary table for rotating an object around an axis of rotation;

an encoder for outputting a rotary angle signal corresponding to a rotary angle of the rotary table;

a detection head for biasing in a predetermined direction a stylus in contact with a surface of the object for outputting an electric signal corresponding to an amount in movement of the stylus;

horizontal guiding means for guiding the detection head so as to align the predetermined direction with a direction which passes through the axis of rotation;

vertical guiding means for guiding said horizontal guiding means in a direction parallel to the axis of rotation; and polarity reversing means for reversing positive and negative signs of the electric signal from the detection head when the stylus is moved across the axis of rotation by the horizontal guiding means.

4. The roundness measuring apparatus of claim 3, wherein said object has a cylindrical shape and said apparatus further comprising angle correction means for adding 180 degree to a signal from the encoder when the stylus is moved across the axis of rotation by the horizontal guiding means.

5. The roundness measuring apparatus of claim 3, wherein the detection head is biased solely in one direction.

6. The roundness measuring apparatus of claim 5, wherein said object has a cylindrical shape and said apparatus further comprising angle correction means for adding 180 degree to a signal from the encoder when the stylus is moved across the axis of rotation by the horizontal guiding means.

7. The roundness measuring apparatus of claim 3, wherein said object has a cylindrical shape and said apparatus further comprising angle correction means for adding 180 degree to a signal from the encoder when the stylus is moved across the axis of rotation by the horizontal guiding means, the roundness measuring apparatus further comprising:

a memory for storing a first position data including the electric signal and the rotary angle signal corresponding thereto when the polarity reversing means does not reverse positive and negative signs of the electric signal, and for storing a second position data including the electric signal with reversed positive and negative signs, and the corrected angle signal corresponding thereto when the polarity reversing means reverses positive and negative signs of the electric signal.

8. The roundness measuring apparatus of claim 7, further comprising:

a display for displaying the first position data and the second position data aligned on the same radius by the rotary angle signal and the corrected angle signal as displacements from an ideal circle.

* * * * *